(12) United States Patent
Song et al.

(10) Patent No.: US 8,942,751 B2
(45) Date of Patent: Jan. 27, 2015

(54) APPARATUS AND METHOD FOR REPORTING TRANSMISSION POWER, AND APPARATUS AND METHOD FOR DETERMINING TRANSMISSION POWER

(75) Inventors: Kuk Jin Song, Yongin-si (KR); Seung Hyun Lee, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 636 days.

(21) Appl. No.: 13/264,756

(22) PCT Filed: Apr. 2, 2010

(86) PCT No.: PCT/KR2010/002032
§ 371 (c)(1),
(2), (4) Date: Oct. 17, 2011

(87) PCT Pub. No.: WO2010/120057
PCT Pub. Date: Oct. 21, 2010

(65) Prior Publication Data
US 2012/0040709 A1    Feb. 16, 2012

(30) Foreign Application Priority Data
Apr. 16, 2009  (KR) .................. 10-2009-0033179

(51) Int. Cl.
*H04B 7/00* (2006.01)
*H04W 52/26* (2009.01)
*H04W 52/36* (2009.01)

(52) U.S. Cl.
CPC .......... *H04W 52/262* (2013.01); *H04W 52/365* (2013.01); *Y02B 60/50* (2013.01)
USPC ................................ 455/522; 455/68; 455/69

(58) Field of Classification Search
CPC .. H04W 52/262; H04W 52/365; H04W 52/26
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS

| | | | |
|---|---|---|---|
| 7,616,596 B2 * | 11/2009 | Lee et al. ................. 370/326 |
| 2005/0135497 A1 * | 6/2005 | Kim et al. ................ 375/267 |
| 2007/0054624 A1 * | 3/2007 | Kashiwagi ............. 455/67.13 |
| 2007/0099647 A1 | 5/2007 | Lee et al. |
| 2007/0265026 A1 | 11/2007 | You et al. |
| 2008/0165723 A1 | 7/2008 | Kim |
| 2008/0165877 A1 * | 7/2008 | Guo et al. ................ 375/262 |
| 2009/0074086 A1 * | 3/2009 | Murakami et al. ........ 375/260 |
| 2009/0213961 A1 * | 8/2009 | Park et al. ................. 375/297 |
| 2010/0075663 A1 | 3/2010 | Chang et al. |

* cited by examiner

*Primary Examiner* — Dominic E Rego (57) ABSTRACT

Disclosed is an apparatus for reporting transmission power. The apparatus for reporting transmission power includes a transmission power normalization unit, a message generation unit, and a transmission unit. The transmission power normalization unit normalizes a first transmission power at a current Modulation and Coding Scheme (MCS) level into a second transmission power at a reference MCS level, the current MCS level being an MCS level of a burst which is intended to comprise a transmission power report of a terminal. The message generation unit generates a message comprising the transmission power report of the terminal with the second transmission power defined therein. The transmission unit transmits the generated message to a base station.

18 Claims, 6 Drawing Sheets

FIG.1

PRIOR ART

FIG.2

PRIOR ART

FIG.3

PRIOR ART

| Modulation / FEC rate | Normalized C/N |
|---|---|
| ACK region | -3 |
| FAST FEEDBACK | 0 |
| CDMA code | 3 |
| QPSK 1/3 | 0.5 |
| QPSK 1/2 | 6 |
| QPSK 2/3 | 7.5 |
| QPSK 3/4 | 9 |
| 16-QAM-1/2 | 12 |
| 16-QAM-2/3 | 14.5 |
| 16-QAM-3/4 | 15 |
| 16-QAM-5/6 | 17.5 |
| 64-QAM-1/2 | 18 |
| 64-QAM-2/3 | 20 |
| 64-QAM-3/4 | 21 |
| 64-QAM-5/6 | 23 |

APPARATUS AND METHOD FOR REPORTING TRANSMISSION POWER, AND APPARATUS AND METHOD FOR DETERMINING TRANSMISSION POWER

CROSS REFERENCE TO RELATED APPLICATIONS

This application claims the benefit of the Korean Patent Application No. 10-2009-0033179 filed on Apr. 16, 2009, which is hereby incorporated by reference as if fully set forth herein.

BACKGROUND

1. Field of the Invention

The present invention relates to a broadband wireless communication system, and more particularly, to a transmission power report in a broadband wireless communication system.

2. Discussion of the Related Art

As the wireless communication industry is advanced and user requirements for Internet service increase, a related art mobile communication system for providing voice service cannot satisfy user requirements. Due to this reason, wireless communication systems are being recently developed for providing not only voice service but also Internet service.

In such wireless communication systems, as a communication system proposed by Institute of Electrical and Electronics Engineers (IEEE) 802.16, a broadband wireless communication system (called Broadband Wireless Access (BWA)) using Orthogonal Frequency Division Multiplexing Access (OFDMA) has a broader data bandwidth than a related art wireless communication technology for voice service, and thus transmit much data for a relatively short time and enable the efficient use of a channel because all users share the channel.

In a wireless communication system based on IEEE 802.16, a base station determines the transmission power of a corresponding terminal, the size of uplink transmission data that is to be allocated to the terminal, and/or the Modulation and Coding Scheme (MCS) level of the terminal by using the transmission power report provided by the terminal. Specifically, the base station calculates the power headroom of a corresponding terminal by using the maximum transmission power of the terminal included in an SS Basic Capability Request (SBC-REQ) message and a transmission power included in the transmission power report that is transmitted from the terminal, and determines the transmission power of the terminal with the calculated power headroom.

Figure 1:
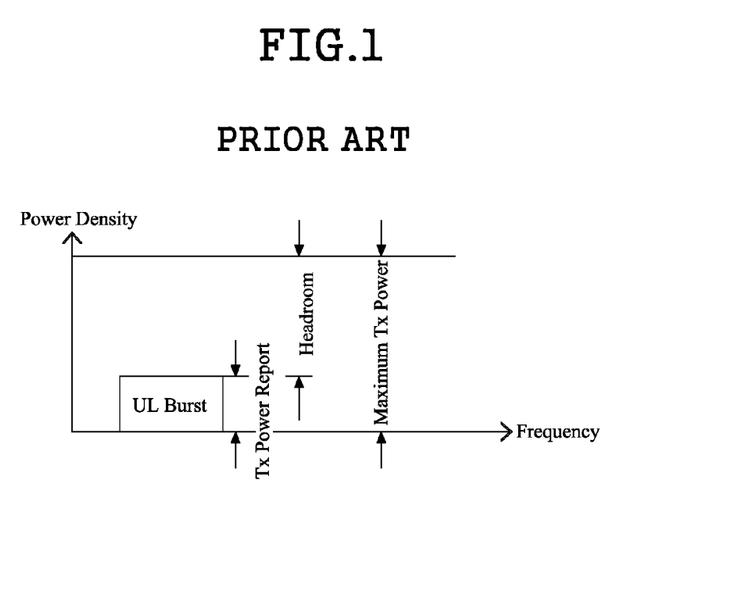
FIG. 1 is a diagram illustrating a method of calculating power headroom.

For example, as illustrated in FIG. 1, when the maximum transmission power of a corresponding terminal is 23 dBm and a transmission power included in the transmission power report that is transmitted from the terminal is 13 dBm, the power headroom of the terminal is 10 (i.e., 23-13) dBm. In this case, when data having the same MCS level and same size is allocated to the terminal, a base station increases the transmission power of the terminal by 10 dBm.

Herein, the transmission power report that is transmitted from the terminal to the base station is defined as the power density of a burst including the transmission power report, in which case the power density is changed according to the MCS level (hereinafter referred to as a current MCS level) of the burst including the transmission power report based on the Open Loop Power Control (OLPC) rule of IEEE802.16e. Therefore, when the normalized C/N (which is transferred to all terminals with a broadcasting message) is changed according to the current MCS level, the power headroom of a corresponding terminal is changed according to the current MCS level of the terminal even though wireless environments are the same, and thus, the transmission power of the terminal is also changed according to the current MCS level of the terminal.

Figure 2:
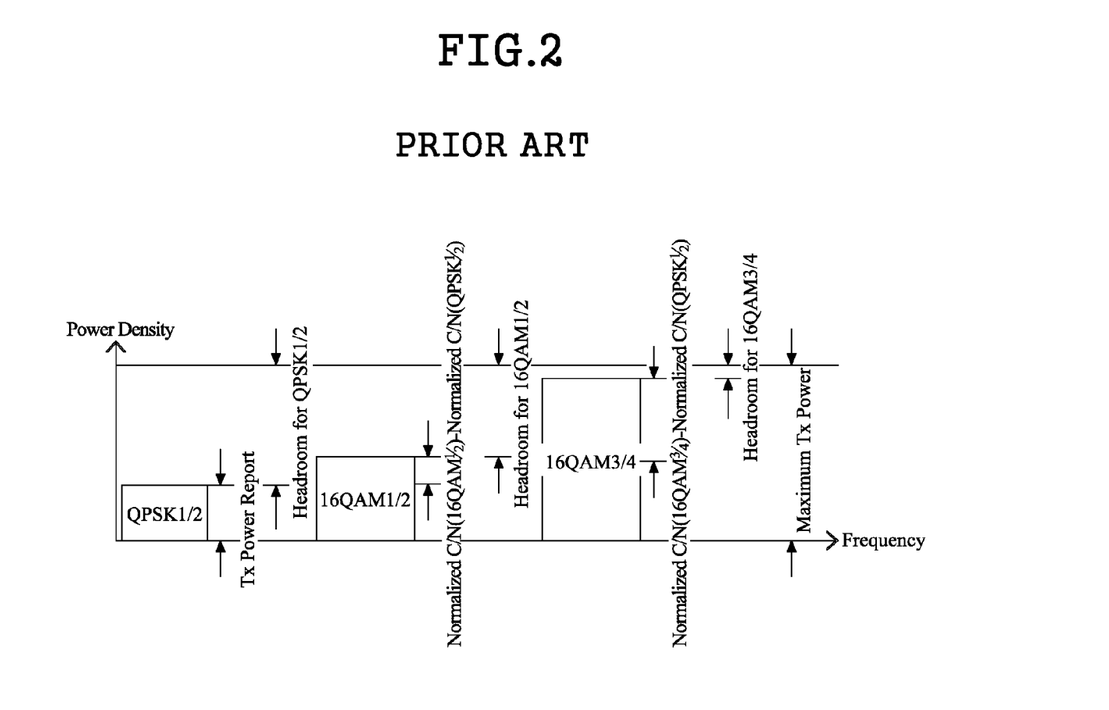
FIGS. 2 and 3 are diagrams showing respective differences between power headrooms by MCS level.

As an example, as illustrated in FIG. 2, if a current MCS level is Quadrature Phase Shift Keying (QPSK) ½, it can be seen that a difference of between power headrooms based on each MCS level equal to a different between normalized C/Ns corresponding to each the MCS levels. Alternatively, if the current MCS level is changed from QPSK ½ to 16 Quadrature Amplitude Modulation (QAM) ½, it can be seen that power headroom based on each MCS level is changed as illustrated in FIG. 3.

Figure 3:
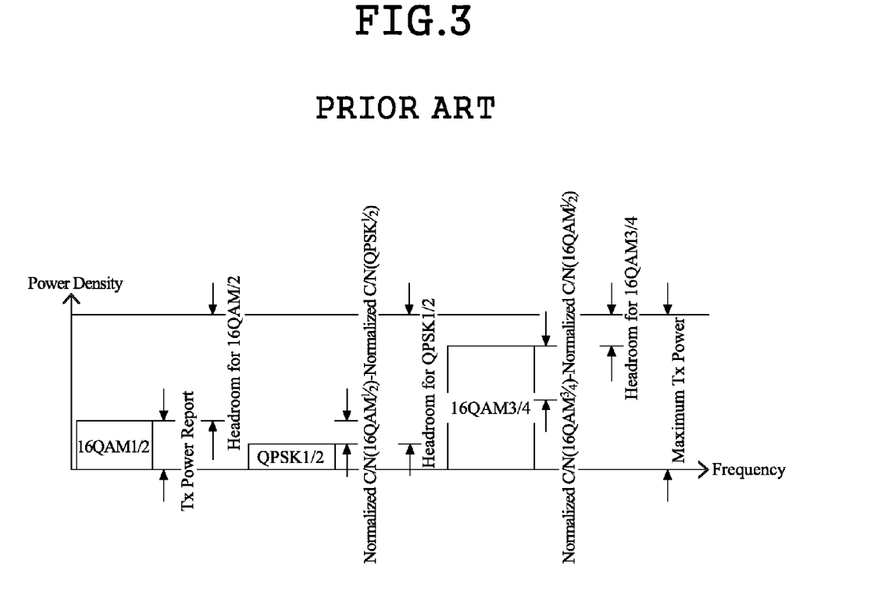

That is, as seen in FIGS. 2 and 3, although a transmission power reported by a corresponding terminal is constant, when a current MCS level is changed, the power headroom of the terminal is changed.

Accordingly, a base station is required to know a current MCS level in advance, for accurately calculating the power headroom of a terminal. For this end, there are a method where the physical layer (PHY) of the base station transfers both the current MCS level and the transmission power report transmitted from the terminal, to a MAC layer, and a method where the MAC layer accurately memorizes MAP information of a frame that has received the transmission power report. However, it is difficult to apply the methods to both the physical layer and MAC layer.

Considering the time delay between the scheduling time and receiving time of a burst, particularly, the burden given to a base station increases further because the base station is required to memorize the MCS levels of respective bursts for two frames and three frames.

SUMMARY

Accordingly, the present invention is directed to provide apparatus and method for reporting transmission power, and apparatus and method for determining transmission power that substantially obviate one or more problems due to limitations and disadvantages of the related art.

An aspect of the present invention is directed to provide apparatus and method for reporting transmission power, and apparatus and method for determining transmission power, which can efficiently calculate power headroom of a terminal.

Another aspect of the present invention is directed to provide apparatus and method for reporting transmission power, and apparatus and method for determining transmission power, which enable a base station to determine a transmission power of a corresponding terminal even without knowing a scheduled current MCS level of the terminal.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an apparatus for reporting transmission power comprising: a transmission power normalization unit normalizing a first transmission power at a current Modulation and Coding Scheme (MCS) level into a second transmission power at a reference MCS level, the current MCS level being an MCS level of a burst which is intended to comprise a transmission power report of a terminal; a message generation unit generating a message comprising the transmission power report of the terminal with the second transmission power defined therein; and a transmission unit transmitting the generated message to a base station.

In another aspect of the present invention, there is provided an apparatus for determining transmission power comprising: a reception unit receiving a transmission power normalized at a reference Modulation and Coding Scheme (MCS) level from a terminal; a headroom calculation unit calculating power headroom corresponding to respective MCS levels by using the normalized transmission power and a maximum transmission power of the terminal; and a scheduler determining at least one of a transmission power of the terminal, a size of uplink data to be allocated to the terminal, and an MCS level of the terminal, on the basis of the power headroom corresponding to the respective MCS levels.

In another aspect of the present invention, there is provided a method for reporting transmission power comprising: acquiring a transmission power at a current Modulation and Coding Scheme (MCS) level, which is an MCS level of a burst intended to comprise a transmission power report of a terminal; normalizing the transmission power at the current MCS level into a transmission power at a reference MCS level; and transmitting a transmission power report of the terminal with the normalized transmission power defined therein, to a base station.

In another aspect of the present invention, there is provided a method for determining transmission power comprising: calculating a power headroom corresponding to respective MCS levels by using a maximum transmission power of a terminal and a transmission power normalized at a reference Modulation and Coding Scheme (MCS) level, when a transmission power report with the normalized transmission power defined therein is received; and determining at least one of a transmission power of the terminal, a size of uplink data to be allocated to the terminal, and an MCS level of the terminal, on the basis of the power headroom corresponding to the respective MCS levels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 4:
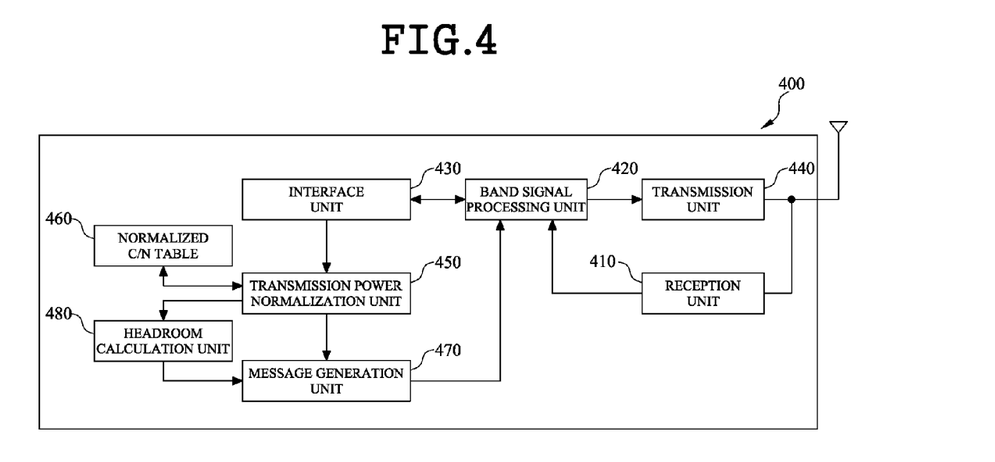
FIG. 4 is a block diagram schematically illustrating a transmission power reporting apparatus according to an embodiment of the present invention.

FIG. 4 is a block diagram schematically illustrating a transmission power reporting apparatus according to an embodiment of the present invention.

Referring to FIG. 4, a transmission power reporting apparatus 400 includes a reception unit 410, a band signal processing unit 420, an interface unit 430, a transmission unit 440, a transmission power normalization unit 450, and a message generation unit 470. In an embodiment of the present invention, the transmission power reporting apparatus 400 may be a terminal that transmits a transmission power report to a base station. In the following description, for convenience, the transmission power reporting apparatus 400 is assumed as being a terminal.

In a receiving path, the reception unit 410 receives a wireless signal from a base station (not shown) through an antenna and converts the received signal into a baseband signal. For example, the reception unit 410 removes noise from the wireless signal and amplifies the wireless signal, for reception of data in a terminal. Subsequently, the reception unit 410 down-converts the amplified signal into the baseband signal and digitalizes the down-converted baseband signal.

The band signal processing unit 420 extracts information or a data bit from the digitalized signal and performs a demodulating operation, a decoding operation, and an error correcting operation. The extracted information is transferred to an upper layer via the interface unit 430.

In a transmitting path, the interface unit 430 receives voice or data that is transferred from the upper layer, and transfers the voice or data to the band signal processing unit 420. The band signal processing unit 420 encodes the voice or data and outputs the encoded voice or data to the transmission unit 440. In the embodiment, particularly, the band signal processing unit 420 receives a message, including a transmission power report of the terminal, from the message generation unit 470 and transfers the message to the transmission unit 440.

The transmission unit 440 modulates the encoded voice or data into a carrier signal having a desired specific frequency, amplifies the carrier signal to a level suitable for transmission, and transmits the amplified carrier signal to an air through the antenna. Particularly, the transmission unit 440 transmits the message, which includes the transmission power report of the terminal and is transferred from the band signal processing unit 420, to the base station through the antenna.

The transmission power normalization unit 450 normalizes a transmission power at an MCS level (hereinafter referred to as a current MCS level) of a burst intended to include the transmission power report, into a transmission power at a reference MCS level. Herein, the reference MCS level may be an MCS level that has been agreed in advance between the terminal and base station. In the embodiment, the reference MCS level may be set as the lowest MCS level in a plurality of MCS levels capable of being applied to an uplink period. For example, the reference MCS level may be set as QPSK ½.

Herein, the reason that the transmission power normalization unit 450 normalizes the transmission power of the terminal is for enabling the base station to calculate accurate power headroom for the terminal even without knowing a current MCS level when calculating the power headroom for the terminal.

That is, in the related art, even though a transmission power included in a transmission power report transmitted from a terminal to a base station is constant, since power headroom for the terminal is changed according to an MCS level (i.e., a current MCS level) of a burst including the transmission power report, the base station is required to know the current MCS level of the terminal in advance for calculating accurate power headroom for the terminal.

However, the normalization power normalization unit 450 normalizes a transmission power at a current MCS level into a transmission power at the reference MCS level, which has been agreed in advance between a corresponding terminal and base station, so as to enable the base station to easily calculate power headroom for the terminal even without knowing the current MCS level of the terminal.

Figure 5:
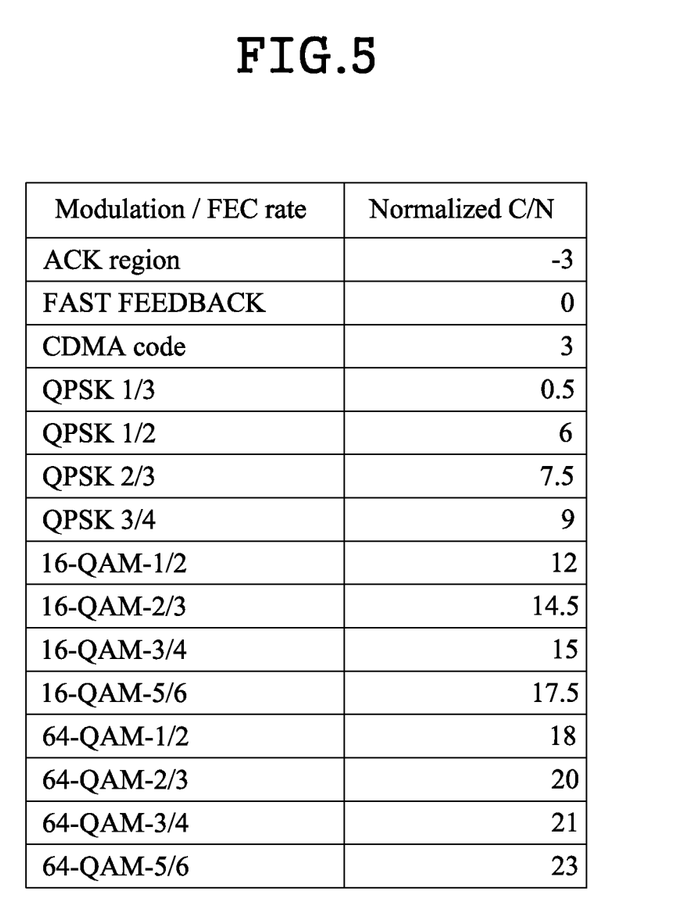
FIG. 5 is a diagram showing a normalized C/N table.

In the embodiment, the transmission power normalization unit 450 may normalize the transmission power of the terminal by using a normalized C/N table 460 illustrated in FIG. 5. The normalized C/N table 460 may be acquired from an Uplink Channel Descriptor (UCD) that is broadcasted by the base station.

Hereinafter, a method will be described in detail where the transmission power normalization unit 450 normalizes a transmission power at the current MCS level by using the normalized C/N table 460. First, the transmission power normalization unit 450 checks Carrier to Interference Noise Ratio (CINR) of a current MCS level in the normalized C/N table 460, and subtracts CINR of a reference MCS level from CINR of the current MCS level.

Subsequently, the transmission power normalization unit 450 normalizes the transmission power at on the current MCS level into the transmission power at the reference MCS level by adding the subtracted result value to the transmission power at the current MCS level.

When the reference MCS level is assumed as QPSK ½, a method of calculating a normalized transmission power is expressed as Equation (1) below.

$$\text{Normalized } UL \text{ } Tx \text{ Power} = UL \text{ } Tx \text{ Power} + \{\text{Normalized } C/N(\text{QPSK } \frac{1}{2}) - \text{Normalized } C/N(\text{MCS}_{burst})\} \quad (1)$$

where Normalized UL Tx Power denotes a normalized transmission power, UL Tx Power denotes a transmission power at a current MCS level, Normalized C/N (QPSK ½) indicates a CINR value of QPSK ½ in the normalized C/N table, and Normalized C/N (MCS$_{burst}$) indicates CINR value (i.e., CINR value of a current MCS level) of an MCS level for a burst intended to include a transmission power report in the normalized C/N table.

When the reference MCS level has been set as QPSK ½, as an example, a method will be described below where the transmission power normalization unit 450 normalizes the transmission power of the terminal by using the normalized C/N table 460.

First, when the current MCS level is QPSK ½ and the transmission power is 10 dbm, a normalized transmission power is 10 bdm because the current MCS level is the same as the reference MCS level.

Moreover, when the current MCS level is 16 QAM ½ and the transmission power is 10 dbm, a subtracted result value is −6 bdm because a CINR of QPSK ½ being the reference MCS level is 6 and a CINR of 16 QAM ½ being the current MCS level is 12 in the normalized C/N table 460. Accordingly, the normalized transmission power is 4 dbm that is the sum of −6 dbm (which is the subtracted result value) and 10 dbm (which is the transmission power).

Furthermore, when the current MCS level is 64 QAM ½ and the transmission power is 10 dbm, a subtracted result value is −12 dbm because a CINR of QPSK ½ being the reference MCS level is 6 and a CINR of 64 QAM ½ being the current MCS level is 18 in the normalized C/N table 460. Accordingly, the normalized transmission power is −2 dbm that is the sum of −12 dbm (which is the subtracted result value) and 10 dbm (which is the transmission power).

Referring again to FIG. 4, the message generation unit 470 generates the transmission power report (TX Power Report) of the terminal by using the transmission power that has been normalized by the transmission power normalization unit 450, and generates a message including the generated transmission power report to transfer the message to the band signal processing unit 420.

In the embodiment, the message generation unit 470 may generate an SBC-REQ message as the message including the transmission power report, or generate a Bandwidth Request and Transmission Power Report Header (BR and Tx power report header) message.

According to the embodiment, as described above, since the terminal does not report the transmission power at the current MCS level to the base station but normalizes the transmission power at the reference MCS level (which has been agreed in advance between the terminal and base station) to transmit the normalized transmission power to the base station, the base station can accurately calculate the power headroom of the terminal even without knowing the current MCS level of the terminal, by using the normalized transmission power and maximum transmission power that are included in the transmission power report transmitted from the terminal.

In the above-described embodiment, the terminal has been described as merely reporting the normalized transmission power to the base station. In a modified embodiment, however, a terminal may directly calculate normalized power headroom and report the calculated result to a base station. For this end, as illustrated in FIG. 4, the transmission power reporting apparatus 400 may further include a headroom calculation unit 480 for calculating the normalized power headroom.

Specifically, the headroom calculation unit 480 calculates normalized power headroom of a corresponding terminal by subtracting a normalized transmission power from the maximum transmission power of the terminal.

According to the modified embodiment, the message generation unit 470 may additionally generate a message including the normalized power headroom. In an embodiment of the present invention, the message generation unit 470 may generate a PHY channel Report Header message as message including the normalized power headroom.

The generated message is transmitted to the base station through the transmission unit 440.

Figure 6:
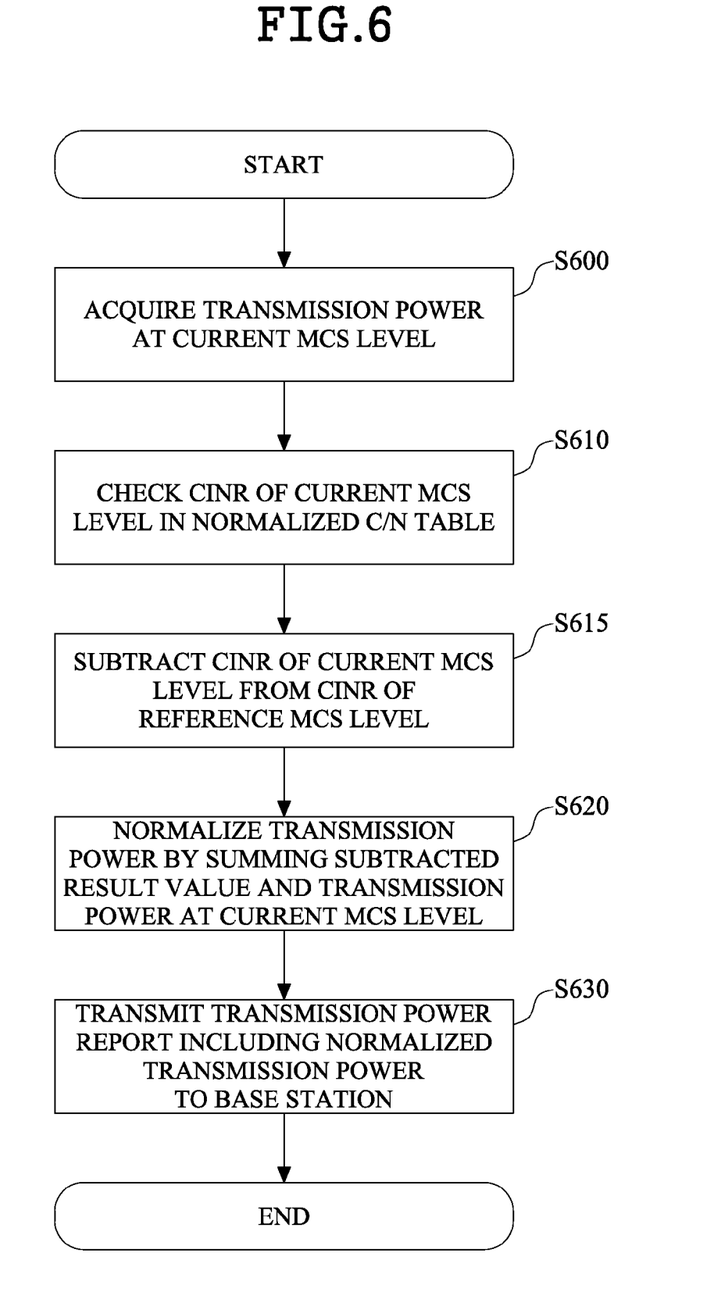
FIG. 6 is a flowchart illustrating a transmission power reporting method according to an embodiment of the present invention.

Hereinafter, a transmission power reporting method according to an embodiment of the present invention will be described in detail with reference to FIG. 6. FIG. 6 is a flowchart illustrating a transmission power reporting method according to an embodiment of the present invention.

In operation S600, the transmission power reporting apparatus 400 acquires a transmission power at a current MCS level. In operation S610, subsequently, the transmission power reporting apparatus 400 checks a CINR of current MCS level in the normalized C/N table. In the embodiment, the normalized C/N table may be acquired from the UCD message that is broadcasted from the base station.

The transmission power reporting apparatus 400 subtracts the current MCS level of CINR from a reference MCS level of CINR in operation S615, and normalizes the transmission power by adding the subtracted result value to the transmission power based on the current MCS level in operation S620. Herein, the reference MCS level may be an MCS level that has been agreed in advance between the terminal and base station. In the embodiment, the reference MCS level may be set as the lowest MCS level in a plurality of MCS levels capable of being applied to an uplink period.

In operation 630, the transmission power reporting apparatus 400 transmits a transmission power report including the normalized transmission power to the base station. In the embodiment, the transmission power report including the normalized transmission power may be included in the SBC-REQ message or BR and Tx Power Report Header message and transmitted to the base station.

In the above-described embodiment, the terminal has been described as merely reporting the normalized transmission power to the base station. In a modified embodiment, however, a terminal may directly calculate normalized power headroom and report the calculated result to a base station.

For this end, the transmission power reporting method according to an embodiment of the present invention may additionally include an operation of calculating the normalized power headroom, and an operation of generating a message including the normalized power headroom. In this case, the normalized power headroom may be calculated by subtracting the normalized transmission power from the maximum transmission power of the terminal, and a PHY Channel Report Header message including the normalized power headroom may be transmitted to the base station.

Hereinafter, a transmission power determining apparatus and method according to an embodiment of the present invention will be described in detail with reference to FIGS. 7 to 9.

Figure 7:
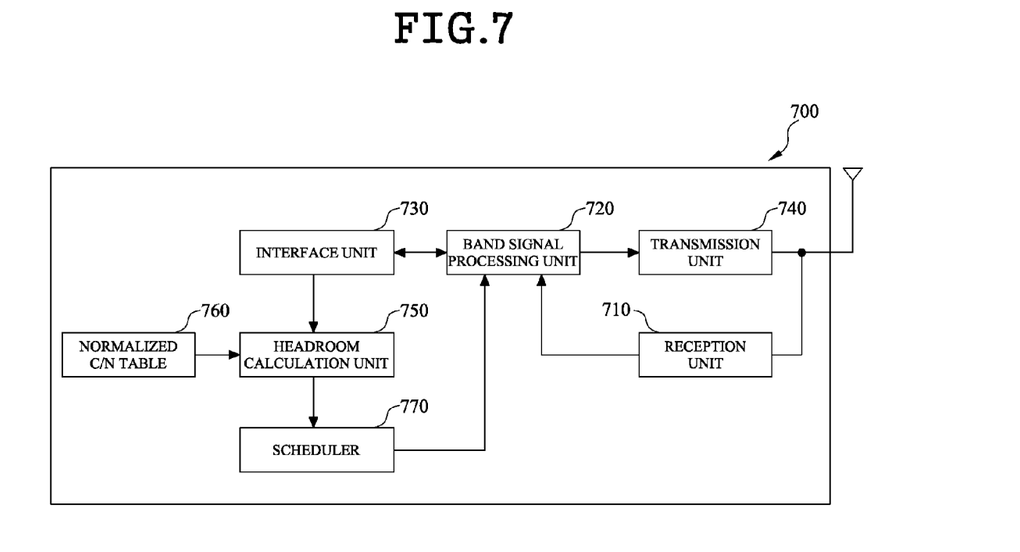
FIG. 7 is a block diagram schematically illustrating a transmission power determining apparatus according to an embodiment of the present invention.

FIG. 7 is a block diagram schematically illustrating a transmission power determining apparatus according to an embodiment of the present invention.

Referring to FIG. 7, a transmission power determining apparatus 700 includes a reception unit 710, a band signal processing unit 720, an interface unit 730, a transmission unit 740, a headroom calculation unit 750, and a scheduler 770. In an embodiment of the present invention, the transmission power determining apparatus 700 may be a base station. In the following description, for convenience, the transmission power determining apparatus 700 is assumed as being a base station.

In a receiving path, the reception unit 710 receives a wireless signal from a terminal (not shown) through an antenna and converts the received signal into a baseband signal. For example, the reception unit 710 removes noise from the wireless signal and amplifies the wireless signal, for receiving data from the terminal. Subsequently, the reception unit 710 down-converts the amplified signal into the baseband signal and digitalizes the down-converted baseband signal. In the embodiment, particularly, the reception unit 710 receives a message, including a transmission power report of the terminal, from the terminal and transfers the message to the band signal processing unit 720.

In the embodiment, normalized transmission power is included in the transmission power report included in the message that is received by the reception unit 710.

The band signal processing unit 720 extracts information or a data bit from the digitalized signal and performs a demodulating operation, a decoding operation, and an error correcting operation. The extracted information is transferred to an upper layer via the interface unit 730. Particularly, the band signal processing unit 720 decodes the message including the transmission power report and transfers the decoded message to the below-described headroom calculation unit 750 via the interface unit 730.

In a transmitting path, the interface unit 730 receives voice, data, or control information from a control station (not shown) or a wireless network (not shown), and the band signal processing unit 720 encodes the voice, data, or control information to transfer the encoded voice, data, or control information to the transmission unit 740. The transmission unit 740 modulates the encoded voice, data, or control information into a carrier signal having a desired transmission frequency or frequencies, amplifies the carrier signal to a level suitable for transmission, and transmits the amplified carrier signal to an air through the antenna.

The headroom calculation unit 750 receives the normalized transmission power of the terminal from the interface unit 730, and calculates power headroom corresponding to each MCS level using the normalized transmission power and the maximum transmission power of the terminal. In the embodiment, the maximum transmission power of the terminal may be acquired from an SBC-REQ message transmitted by the terminal, and changed according to MCS levels.

Herein, the normalized transmission power is a result value that is obtained by summing a transmission power at a current MCS level and a difference value between a current CINR of current MCS level of a corresponding terminal and CINR of a reference MCS level in a normalized C/N table.

Particularly, in order to calculate power headroom of corresponding to each MCS level, the headroom calculation unit 750 first checks CINR of a specific MCS level in a normalized C/N table 760, and adds a result value, which is obtained by subtracting the CINR of reference MCS level from CINR of the specific MCS level, to the normalized transmission power. Finally, the headroom calculation unit 750 calculates power headroom at the specific MCS level by subtracting the summed result value from the maximum transmission power of the terminal. The headroom calculation unit 760 performs the above-described operation on each MCS level, and thus calculates power headroom corresponding to each MCS level.

When the reference MCS level is QPSK ½, a method of calculating power headroom corresponding to each MCS level is expressed as Equation (2) below.

$$\text{Headroom } (MCS) = \text{Maximum } Tx \text{ Power } (MCS) - \quad (2)$$

$$[\text{Normalized } UL \text{ } Tx \text{ Power } +$$

$$\{\text{Normalized } C/N(MCS) - \text{Normalized } C/N(QPSK\,1/2)\}]$$

where Headroom (MCS) indicates power headroom at a specific MCS level, Maximum Tx Power (MCS) indicates the maximum transmission power of the terminal at the specific MCS level, Normalized UL Tx Power indicates the normalized transmission power of the terminal, Normalized C/N (MCS) indicates CINR of a specific MCS level in the normalized C/N table, and Normalized C/N (QPSK ½) indicates a CINR of QPSK ½ in the normalized C/N table.

Hereinafter, as an example, a method will be described in detail where the headroom calculation unit 750 calculates power headroom of a terminal at a specific MCS level when a reference MCS level is set as 16 QAM ½, normalized transmission power is 10 dbm, and the maximum transmission power is 23 dbm.

First, when a specific MCS level is QPSK ½, since a CINR of QPSK ½ is 6 dbm and a CINR of 16 QAM ½ is 12 dbm in the normalized C/N table 760, a result value that is obtained by performing subtraction on the CINRs is −6 dbm. Also, the sum of −6 dbm being the subtracted result value and 10 dbm being the normalized transmission power of the terminal is 4 dbm, and thus, since 19 dbm is obtained by subtracting 4 dbm being the summed result value from 23 dbm being the maximum transmission power, power headroom at QPSK ½ is 19 dbm.

Moreover, when a specific MCS level is 16 QAM ¾, since a CINR of 16 QAM ¾ is 15 dbm and a CINR of 16 QAM ½ is 12 dbm in the normalized C/N table 760, a result value that is obtained by performing subtraction on the CINRs is 3 dbm. Also, the sum of 3 dbm being the subtracted result value and 10 dbm being the normalized transmission power of the terminal is 13 dbm, and thus, since 10 dbm is obtained by subtracting 13 dbm being the summed result value from 23 dbm being the maximum transmission power, power headroom at 16 QAM ¾ is 10 dbm.

Figure 8:
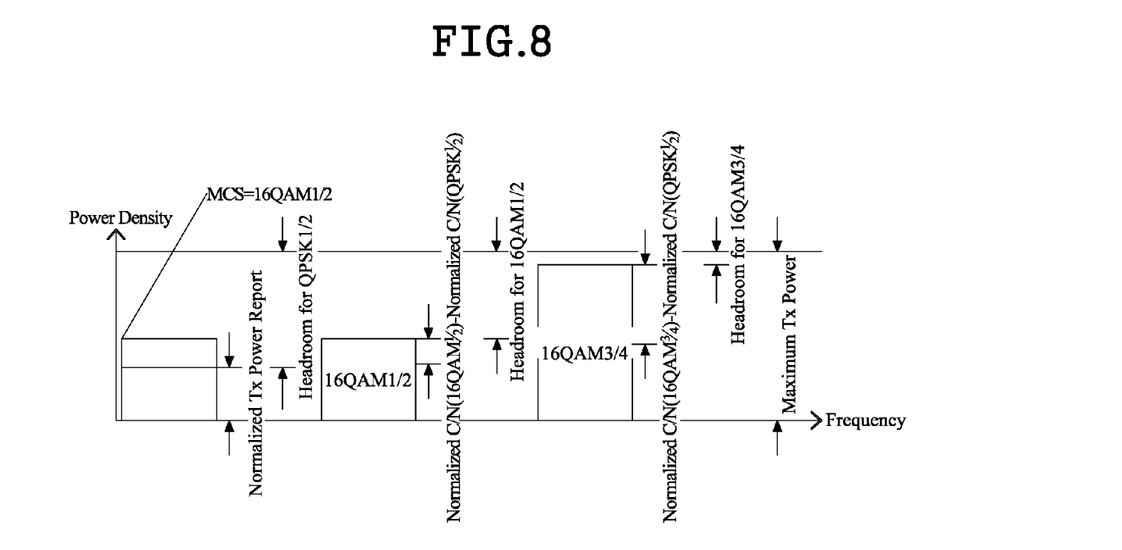
FIG. 8 is a diagram illustrating a method of calculating power headroom using a normalized transmission power, according to an embodiment of the present invention.
Figure 9:
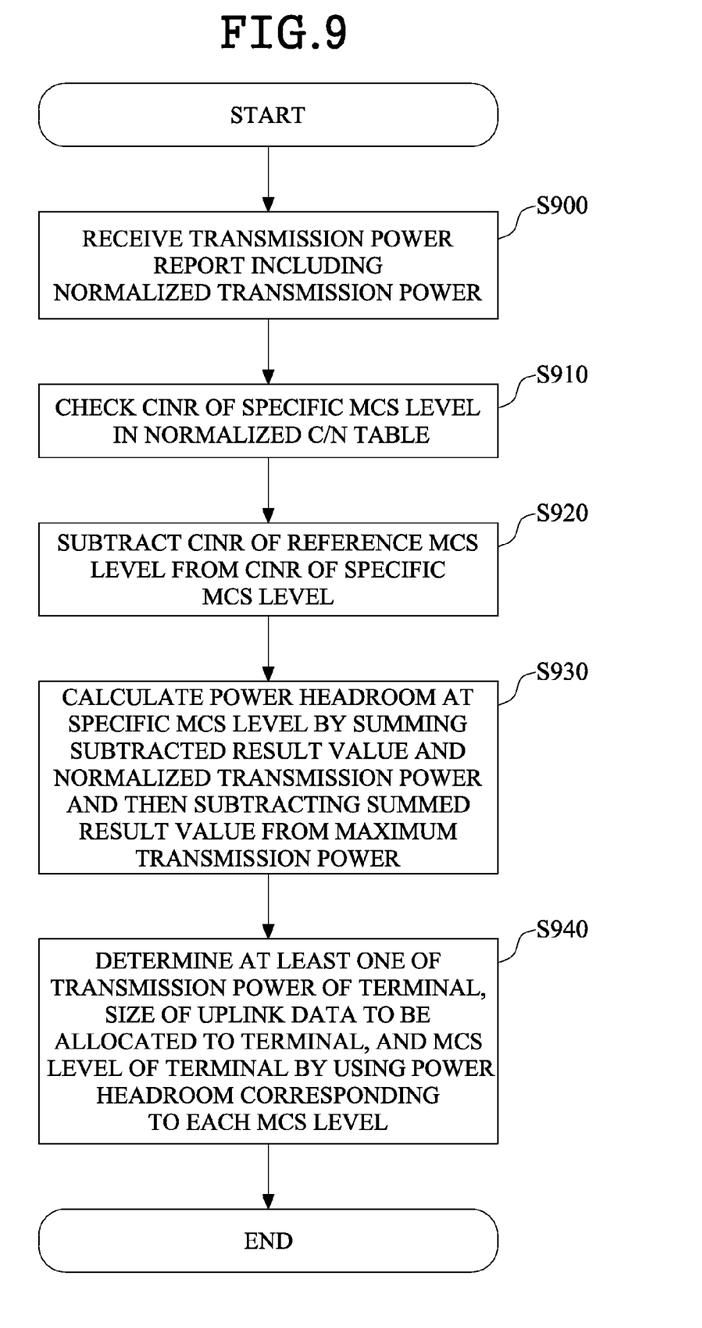
FIG. 9 is a flowchart schematically illustrating a transmission power determining method according to an embodiment of the present invention.

The above-described method is schematized as FIG. 8 where the headroom calculation unit 750 calculates power headroom corresponding to each MCS level by using the normalized transmission power of the terminal.

Referring again to FIG. 7, the scheduler 780 control at least of operation that are respectively performed in the receiving path and transmitting path. Particularly, the scheduler 780 constructs a frame to be transmitted to each terminal by allocating data, which will be transmitted to respective terminals through the transmitting path, in a burst format. The scheduler 780 according to an embodiment of the present invention determines the transmission power of a corresponding terminal, the size of uplink data to be transmitted to the terminal, and/or an MCS level of the terminal, on the basis of the power headroom corresponding to each MCS level that has been calculated by the headroom calculation unit 750.

Hereinafter, a transmission power determining method according to an embodiment of the present invention will be described in detail with reference to FIG. 9. FIG. 9 is a flowchart illustrating a transmission power determining method according to an embodiment of the present invention.

In operation S900, the transmission power determining apparatus 700 receives a transmission power report including a normalized transmission power from a terminal. Herein, the normalized transmission power may be generated by summing a transmission power at a current MCS level and a difference value between CINR of a reference MCS level and CINR of the current MCS level of the terminal in the normalized C/N table.

The transmission power determining apparatus 700 checks CINR of a specific MCS level in the normalized C/N table in operation S910, and subtracts CINR of the reference MCS level from CINR of the specific MCS level in operation S920.

In operation S930, subsequently, the transmission power determining apparatus 700 sums the subtracted result value and the normalized transmission power, and then calculates power headroom at the specific MCS level by subtracting the summed result value from the maximum transmission power.

In operation S940, the transmission power determining apparatus 700 calculates power headroom corresponding to each MCS level by repeatedly performing the above-described operations on each MCS level, and determines at least one of the transmission power of the terminal, the size of uplink data to be allocated to the terminal, and the MCS level of the terminal by using the power headroom corresponding to each MCS level. That is, the transmission power determining apparatus 700 determines the transmission power of a corresponding terminal, the size of uplink data to be allocated to a corresponding terminal, and the MCS level of a corresponding terminal, on the basis of power headroom corresponding to each MCS level.

The above-described transmission power reporting method and transmission power determining method may be realized in a program command type executable in computers and stored in a computer-readable record medium. Herein, the computer-readable record medium may include a program command, a data file, and a data structure individually, or include the combination thereof. Furthermore, program commands stored in the record medium may be designed and constructed particularly for the present invention, or known to those skilled in computer software and usable.

The computer-readable record medium is any data storage device that can store data which can be thereafter read by a computer system. Examples of the computer-readable record medium include ROMs, RAMs, CD-ROMs, DVDs, magnetic tapes, floppy disks, registers, buffers, optical data storage devices, and carrier waves (such as data transmission through the Internet). Such a record medium may be a transmission medium, which includes a carrier for transmitting a signal designating a program command and a data structure, such as light, a metal line, or a wave guide.

Moreover, the program command includes a high-level code, which is executable in computers by using an interpreter, as well as a machine code such as being generated by a compiler. The above-described hardware apparatus may be configured to function as one or more software modules for performing the operation of the present invention, and the reverse is similar thereto.

According to embodiments of the present invention, a base station can efficiently calculate power headroom of a terminal.

Moreover, since a base station calculates power headroom for a corresponding terminal by using the normalized transmission power at the reference MCS level, the base station is not required to memorize the scheduled MCS level of the terminal, and thus, the burden given to the base station can be reduced in calculating the power headroom of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for reporting transmission power comprising:
   a transmission power normalization unit normalizing a first transmission power at a current Modulation and Coding Scheme (MCS) level into a second transmission power at a reference MCS level, the current MCS level being an MCS level of a burst which is intended to comprise a transmission power report of a terminal;

a message generation unit generating a message comprising the transmission power report of the terminal with the second transmission power defined therein; and a transmission unit transmitting the generated message to a base station, wherein the transmission power normalization unit calculates a difference value between Carrier to Interference Noise Ratio (CINR) of the current MCS level and CINR of the reference MCS level, and wherein the transmission power normalization unit normalizes the first transmission power into the second transmission power by summing the difference value and the first transmission power.

2. The apparatus for reporting transmission power according to claim 1, wherein the transmission power normalization unit normalizes the first transmission power into the second transmission power by using a normalized C/N table.

3. The apparatus for reporting transmission power according to claim 1, wherein the reference MCS level is a lowest MCS level in a plurality of MCS levels capable of being applied to an uplink period.

4. The apparatus for reporting transmission power according to claim 1, wherein the message generation unit generates one of an SBC-REQ message and a Bandwidth Request and Transmission Tower Report Header message as the message comprising the transmission power report.

5. The apparatus for reporting transmission power according to claim 1, wherein the transmission power normalization unit acquires the normalized C/N table from an Uplink Channel Descriptor (UCD) message which is broadcasted from the base station.

6. The apparatus for reporting transmission power according to claim 1, further comprising a headroom calculation unit configured to calculate normalized power headroom of the terminal by subtracting the second transmission power from a maximum transmission power of the terminal, wherein the message generation unit generates a message comprising the normalized power headroom.

7. The apparatus for reporting transmission power according to claim 6, wherein the message generation unit generates a PHY Channel Report Header message as the message comprising the normalized power headroom.

8. An apparatus for determining transmission power comprising:

a reception unit receiving a transmission power normalized at a reference Modulation and Coding Scheme (MCS) level from a terminal;

a headroom calculation unit calculating power headroom corresponding to respective MCS levels by using the normalized transmission power and a maximum transmission power of the terminal; and a scheduler determining at least one of a transmission power of the terminal, a size of uplink data to be allocated to the terminal, and an MCS level of the terminal, on the basis of the power headroom corresponding to the respective MCS levels, wherein the normalized transmission power is a result value which is obtained by summing the transmission power and a difference value between Carrier to Interference Noise Ratio (CINR) of a current MCS level and CINR of a reference MCS level, and the current MCS level is an MCS level of a burst which is intended to comprise a transmission power report of the terminal.

9. The apparatus for determining transmission power according to claim 8, wherein CINR of the current MCS level and CINR of the reference MCS level are acquired from a normalized C/N table.

10. The apparatus for determining transmission power according to claim 8, wherein the headroom calculation unit calculates a difference value between CINR value of a reference MCS level and CINR value corresponding to respective MCS levels acquired from a normalized C/N table, sums the difference value and the normalized transmission power, and calculates the power headroom corresponding to the respective MCS levels by subtracting the summed result value from the maximum transmission power.

11. A method for reporting transmission power comprising:

acquiring a transmission power at a current Modulation and Coding Scheme (MCS) level, which is an MCS level of a burst intended to comprise a transmission power report of a terminal;

normalizing the transmission power at the current MCS level into a transmission power at a reference MCS level; and transmitting a transmission power report of the terminal with the normalized transmission power defined therein, to a base station, wherein the normalizing of the transmission power comprises:

acquiring CINR of the current MCS level from a normalized C/N table;

calculating a difference value between the CINR of the current MCS level and CINR of the reference MCS level; and summing the difference value and the transmission power.

12. The method for reporting transmission power according to claim 11, the transmission is normalized at the current MCS level into the transmission power at the reference MCS level, by using Carrier to Interference Noise Ratio (CINR) value of the reference MCS level and CINR value of the current MCS level defined in a normalized C/N table.

13. The method for reporting transmission power according to claim 11, wherein the transmission power report is transmitted by transmitting a Bandwidth Request and Transmission Power Report Header message or an SBC-REQ message comprising the transmission power report.

14. The method for reporting transmission power according to claim 11, further comprising:

calculating normalized power headroom of the terminal by subtracting the normalized transmission power from a maximum transmission power of the terminal; and transmitting a message comprising the normalized power headroom to the base station.

15. The transmission power reporting method according to claim 14, wherein the normalized power headroom is transmitted by transmitting a PHY Channel Report Header message comprising the normalized power headroom.

16. A method for determining transmission power comprising:

calculating a power headroom corresponding to respective MCS levels by using a maximum transmission power of a terminal and a transmission power normalized at a reference Modulation and Coding Scheme (MCS) level, when a transmission power report with the normalized transmission power defined therein is received; and determining at least one of a transmission power of the terminal, a size of uplink data to be allocated to the terminal, and an MCS level of the terminal, on the basis of the power headroom corresponding to the respective MCS levels, wherein the calculating of the power headroom comprises:

acquiring the maximum transmission power;

acquiring CINR corresponding to the respective MCS levels and CINR of the reference MCS level from a normalized C/N table; and calculating the power headroom corresponding to the respective MCS levels by summing the transmission power and a difference value between the CINR corresponding to the respective MCS levels and the CINR of the reference MCS level and subtracting the summed result value from the maximum transmission power.

17. The method for determining transmission power according to claim 16, wherein the normalized transmission power is a result value which is obtained by summing the transmission power and a difference value between Carrier to Interference Noise Ratio (CINR) of a current MCS level of the terminal and CINR of a reference MCS level, in a normalized C/N table.

18. The method for determining transmission power according to claim 16, wherein the maximum transmission power is acquired from an SBC-REQ message.

* * * * *